United States Patent
So et al.

(10) Patent No.: US 11,223,162 B2
(45) Date of Patent: Jan. 11, 2022

(54) AIR CLEANER AND HOME APPLIANCE

(71) Applicant: SAMSUNG ELECTRONICS CO., LTD., Suwon-si (KR)

(72) Inventors: Byung Yul So, Suwon-si (KR); Eun Jae Lee, Suwon-si (KR); Nak Hyun Kim, Suwon-si (KR); Ju Young Kim, Suwon-si (KR); Seung Won Oh, Suwon-si (KR); Tae Yong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 16/232,533

(22) Filed: Dec. 26, 2018

(65) Prior Publication Data

US 2019/0199035 A1 Jun. 27, 2019

(30) Foreign Application Priority Data

Dec. 26, 2017 (KR) .......................... 10-2017-0179111

(51) Int. Cl.
*H01R 13/635* (2006.01)
*H01R 33/90* (2006.01)
(Continued)

(52) U.S. Cl.
CPC ......... *H01R 13/635* (2013.01); *B01D 46/002* (2013.01); *B01D 46/4245* (2013.01);
(Continued)

(58) Field of Classification Search
None
See application file for complete search history.

(56) References Cited

U.S. PATENT DOCUMENTS 4,317,969 A * 3/1982 Riegler ............. H01R 13/6205
 200/52 R
4,481,388 A * 11/1984 Gillam ................. H01R 13/707
 200/51 R
(Continued)

FOREIGN PATENT DOCUMENTS

CN 204757168 11/2015
CN 106813318 6/2017
(Continued)

OTHER PUBLICATIONS

Extended European Search Report dated Sep. 22, 2020 in European Patent Application No. 18896726.9.

(Continued)

*Primary Examiner* — Bobby Ramdhanie
*Assistant Examiner* — Brit E. Anbacht
(74) *Attorney, Agent, or Firm* — Staas & Halsey, LLP

(57) ABSTRACT

An air cleaner includes a first air cleaner having an output part, a second air cleaner configured to be electrically connectable to the first air cleaner, a power adapter detachably provided to supply power to the second air cleaner, a first input terminal provided in the second air cleaner and configured to be electrically connected to the output part, a second input terminal provided in the second air cleaner and configured to be electrically connected to the power adapter; and a switch configured to electrically connect the first input terminal to the output part or to electrically connect the second input terminal to the power adapter.

19 Claims, 19 Drawing Sheets

(51) Int. Cl.
  *H01R 13/631* (2006.01)
  *B01D 46/42* (2006.01)
  *H01R 13/44* (2006.01)
  *B01D 46/00* (2006.01)
  *H01R 13/713* (2006.01)
  *F24F 8/10* (2021.01)

(52) U.S. Cl.
  CPC .............. *F24F 8/10* (2021.01); *H01R 13/44* (2013.01); *H01R 13/631* (2013.01); *H01R 13/713* (2013.01); *H01R 33/90* (2013.01)

(56) References Cited

U.S. PATENT DOCUMENTS

| | | | | |
|---|---|---|---|---|
| 4,738,629 | A * | 4/1988 | Newman | H01R 13/447 200/50.31 |
| 6,926,762 | B2 * | 8/2005 | Kim | F24F 1/0071 96/397 |
| 7,419,533 | B2 * | 9/2008 | Son | B01D 46/0013 55/342 |
| 9,562,702 | B2 * | 2/2017 | Law | F24F 8/10 |
| 9,893,455 | B1 * | 2/2018 | Brodsky | H01R 13/71 |
| 10,056,722 | B1 * | 8/2018 | Ingram | H01R 24/70 |
| 10,139,118 | B2 * | 11/2018 | Law | B01D 46/4263 |
| 2004/0118288 | A1 * | 6/2004 | Kim | F24F 1/0071 96/417 |
| 2005/0172816 | A1 * | 8/2005 | Son | B01D 46/12 96/417 |
| 2012/0003131 | A1 * | 1/2012 | Ibrahim | F01N 3/0275 423/212 |
| 2014/0150488 | A1 * | 6/2014 | Black | F24F 3/14 62/404 |
| 2015/0137770 | A1 * | 5/2015 | Bencuya | H02J 7/0045 320/162 |
| 2015/0333457 | A1 * | 11/2015 | Liu | H01H 13/14 335/208 |
| 2019/0160411 | A1 * | 5/2019 | Chu | F16B 21/165 |
| 2019/0196426 | A1 * | 6/2019 | Cha | F24F 11/0008 |
| 2019/0242595 | A1 * | 8/2019 | Eplee | F24F 13/20 |
| 2020/0103126 | A1 * | 4/2020 | Samuel, Jr. | F24F 13/20 |
| 2020/0298160 | A1 * | 9/2020 | Jeon | F24F 13/28 |
| 2020/0298161 | A1 * | 9/2020 | Jeon | B01D 46/0008 |
| 2020/0298167 | A1 * | 9/2020 | Jeon | B01D 46/4227 |

FOREIGN PATENT DOCUMENTS

| | | |
|---|---|---|
| JP | 62-283682 | 12/1987 |
| JP | 7-67330 | 3/1995 |
| JP | 11-177403 | 7/1999 |
| JP | 2000-315685 | 11/2000 |
| JP | 2003-522372 | 7/2003 |
| KR | 10-1998-021808 | 6/1998 |
| KR | 10-1998-051673 | 9/1998 |
| KR | 20-0198835 | 7/2000 |
| KR | 10-2000-0061582 | 10/2000 |
| KR | 10-2000-0063383 | 11/2000 |
| KR | 10-2001-0061344 | 7/2001 |
| KR | 10-2001-0096105 | 11/2001 |
| KR | 10-2002-0088672 | 11/2002 |
| KR | 10-2003-0054643 | 7/2003 |
| KR | 20-0328981 | 9/2003 |
| KR | 10-2004-0023250 | 3/2004 |
| KR | 10-2004-0056151 | 6/2004 |
| KR | 10-2005-0028484 | 3/2005 |
| KR | 20-0378995 | 3/2005 |
| KR | 10-2005-0066867 | 6/2005 |
| KR | 20-0400743 | 11/2005 |
| KR | 10-2005-0115343 | 12/2005 |
| KR | 2005-538626 | 12/2005 |
| KR | 10-2006-0026319 | 3/2006 |
| KR | 10-2006-0096134 | 9/2006 |
| KR | 10-2006-0133132 | 12/2006 |
| KR | 10-2008-0055074 | 6/2008 |
| KR | 10-2010-0005746 | 1/2010 |
| KR | 10-2010-0115180 | 10/2010 |
| KR | 10-2010-0129370 | 12/2010 |
| KR | 10-1002263 | 12/2010 |
| KR | 10-2011-0083584 | 7/2011 |
| KR | 10-2011-0083585 | 7/2011 |
| KR | 10-2012-0073038 | 7/2012 |
| KR | 10-2012-0073039 | 7/2012 |
| KR | 10-1449706 | 10/2014 |
| KR | 10-1474996 | 12/2014 |
| KR | 10-2016-0113343 | 9/2016 |
| KR | 10-2017-0075901 | 7/2017 |
| KR | 10-2017-0101093 | 9/2017 |

OTHER PUBLICATIONS

International Search Report dated Apr. 17, 2019 in corresponding International Patent Application No. PCT/KR2018/016152.
Written Opinion of the International Searching Authority dated Apr. 17, 2019 in corresponding International Patent Application No. PCT/KR2018/016152.
Chinese Office Action dated Apr. 22, 2021 in Chinese Patent Application No. 201880083660.7.
Notification of the Second Office Action issued by China National Intellectual Property Administration for Chinese Application No. 201880083660.7.
"English-Chinese Computer Network and Communication Terminology in Brief", People's Post and Telecommunications Publishing House, Yu Qi Fen, etc., p. 208, Mar. 31, 2000.

* cited by examiner

AIR CLEANER AND HOME APPLIANCE

CROSS-REFERENCE TO RELATED APPLICATION(S)

This application claims priority to and the benefit of Korean Patent Application No. 10-2017-0179111, filed on Dec. 26, 2017 in the Korean Intellectual Property Office, the disclosure of which is incorporated by reference in its entirety.

BACKGROUND

1. Field

The present disclosure relate to an air cleaner and a home appliance, and more particularly, to a modular type air cleaner and a home appliance capable of being coupled and decoupled.

2. Description of the Related Art

An air cleaner is a device used to remove contaminants from the air. The air cleaner can remove bacteria, viruses, fungi, fine dust, and chemicals that cause odor in the air sucked into the air cleaner.

The air cleaner may be provided with a filter for purifying contaminated indoor air. The air sucked into the air cleaner passes through the filter and is purified as the contaminants are removed. The purified air may be discharged outside the air cleaner.

The air cleaner may be used in a variety of indoor spaces. The interior space may be relatively wide or narrow. As a result, air cleaners with various capacities have been introduced, and users can purchase air cleaners with a capacity suitable for them considering the residential indoor space.

However, in the case of a residential space having both a narrow indoor space and a large indoor space, it is difficult to meet the needs of the user with only one air cleaner of a small capacity or a large capacity. Although it is possible to consider providing several small air cleaners, the several small air cleaners occupy a very large area when the several small air cleaners are used in one large indoor space. When a large-capacity air cleaner is provided, it is impossible to purify a narrow indoor space and a wide indoor space at the same time.

SUMMARY

Therefore, it is an aspect of the present disclosure to provide an air cleaner and a home appliance of which a plurality of the air cleaners or home appliances are coupled to each other to operate together, or are separated and operated independently.

It is another aspect of the present disclosure to provide an air cleaner and a home appliance which can prevent double powering of a combined air cleaner or home appliance when a plurality of the air cleaners or home appliances are combined and operated together.

Additional aspects of the disclosure will be set forth in part in the description which follows and, in part, will be obvious from the description, or may be learned by practice of the disclosure.

In accordance with an aspect of the present disclosure, an air cleaner includes a first air cleaner having an output part, a second air cleaner configured to be electrically connectable to the first air cleaner, a power adapter attachable to or detachable from the second air cleaner, to supply power to the second air cleaner a first input terminal provided in the second air cleaner and configured to be electrically connected to the output part, a second input terminal provided in the second air cleaner and configured to be electrically connected to the power adapter; and a switch configured to electrically connect the first input terminal to the output part or to electrically connect the second input terminal to the power adapter.

The switch may be configured to electrically couple the power adapter and the second input terminal when the power adapter is coupled to the switch, and electrically couple the output part to the first input terminal when the power adapter is disconnected from the switch.

The second air cleaner may be configured to receive power via the first input terminal when the second air cleaner is connected to the first air cleaner, and receive power from the second input terminal when the second air cleaner is connected to the power adapter.

The first air cleaner may include a connection case configured to cover the output part, and the connection case may be configured to press the power adapter in a direction away from the second air cleaner when the second air cleaner coupled to the power adapter is coupled to the first air cleaner.

The power adapter may include a guide protrusion protruding from the connection case to be pressed.

The second air cleaner may include a case inserting opening formed to correspond to the connection case and into which the connection case is inserted, and the guide protrusion may extend inside the case inserting opening.

The second air cleaner may include a guide groove recessed in a bottom surface thereof to guide the guide protrusion.

The output part may be selectively exposed to the outside of the first air cleaner.

The second air cleaner may include a restriction portion formed at a portion connected to the power adapter, and the power adapter may include a limiting protrusion coupled to the restriction portion.

The second air cleaner may include an insertion portion formed on the bottom surface to correspond to the power adapter.

The first air cleaner may be configured to separate the power adapter from the second air cleaner when the second air cleaner coupled to the power adapter is coupled to the first air cleaner.

The switch may be configured to disconnect the first input terminal and the output part when the power adapter is engaged to the switch, and disconnect the second input terminal and the power adapter when the power adapter is disengaged from the switch.

The power adapter may be arranged to interfere with the coupling of the first air cleaner and the second air cleaner when the power adapter is connected to the second air cleaner.

The output part may be disposed on top of the first air cleaner, and at least one of the first input terminal and the second input terminal may be disposed below the second air cleaner.

The bottom surface of the power adapter may be disposed in a same plane as the bottom surface of the second air cleaner when the power adapter is connected to the second air cleaner.

In accordance with another aspect of the present disclosure, a home appliance includes a first module having an output part, a second module configured to be electrically connectable to the first module, a power adapter attachable to or detachable from to the second module, and to supply power to the second module, a first input terminal provided in the second module and configured to be electrically connected to the output part, a second input terminal provided in the second module and configured to be electrically connected to the power adapter; and a switch disposed in the second module and configured to block an electrical connection between the power adapter and the second input terminal when the first module and the second module are combined.

The first module may include a connection case configured to cover at least one of the first input terminal and the second input terminal, and the connection case may be configured to press the power adapter in a direction away from the second module when the second module coupled to the power adapter is coupled to the first module.

The second module may include a restriction portion formed at a portion connected to the power adapter, and the power adapter may include a limiting protrusion coupled to the restriction portion.

The power adapter may be arranged to interfere with the coupling of the first module and the second module when the power adapter is connected to the second module.

The output part may be selectively exposed to outside of the first module.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
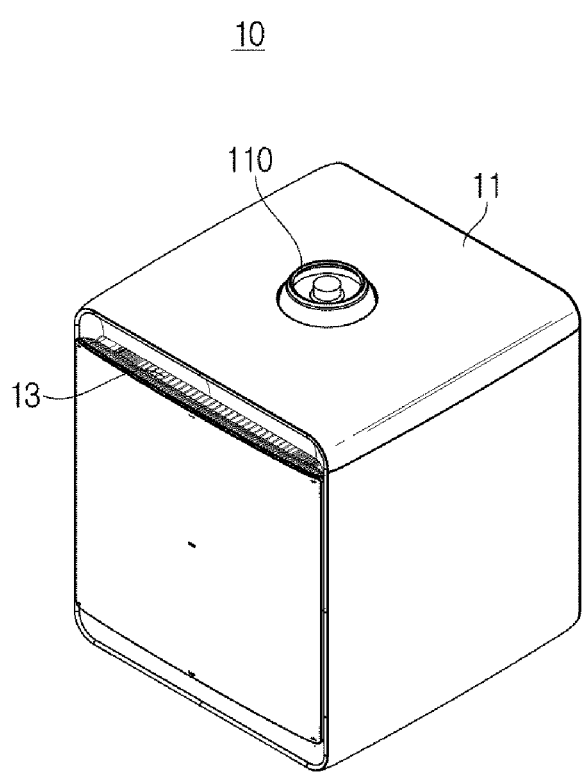
FIG. 1 is a view showing a first air cleaner according to one embodiment of the present disclosure.

Embodiments described herein and configurations shown in the drawings are merely exemplary examples. Also, various modified examples with which these embodiments and the drawings could be replaced may be present at the time of filing of the present application.

Also, throughout the drawings, like reference numerals designate like elements.

Also, the terms used herein explain the embodiments but are not intended to restrict and/or limit the present disclosure. Singular expressions, unless defined otherwise in context, include plural expressions. Throughout the specification, the terms "comprise" and "have", etc. are used herein to specify the presence of stated features, numbers, steps, operations, elements, components or combinations thereof but do not preclude the presence or addition of one or more other features, numbers, steps, operations, elements, components, or combinations thereof.

Also, it should be understood that although the terms "first," "second," etc. may be used herein to describe various components, these components are not limited by these terms. These terms are used only to distinguish one component from another. For example, without departing from the scope of the present disclosure, a first component may be referred to as a second component, and similarly, the second component may be referred to as the first component. The term "and/or" includes any and all combinations of one or a plurality of associated listed items.

Meanwhile, terms used in the specification, such as "top," "bottom," and "right side" are defined on the basis of the drawings, and shapes and positions of components are not limited to the terms.

Hereinafter, an air cleaner will be described as an example for convenience of explanation, however, the configuration for preventing the double power supply according to the embodiment of the present disclosure is not limited to the air cleaner, but can be applied to any home appliance in which a plurality of devices can be combined and used, for example, a humidifier or dehumidifier.

Hereinafter, embodiments according to the present disclosure will be described in detail with reference to the attached drawings.

Figure 2:
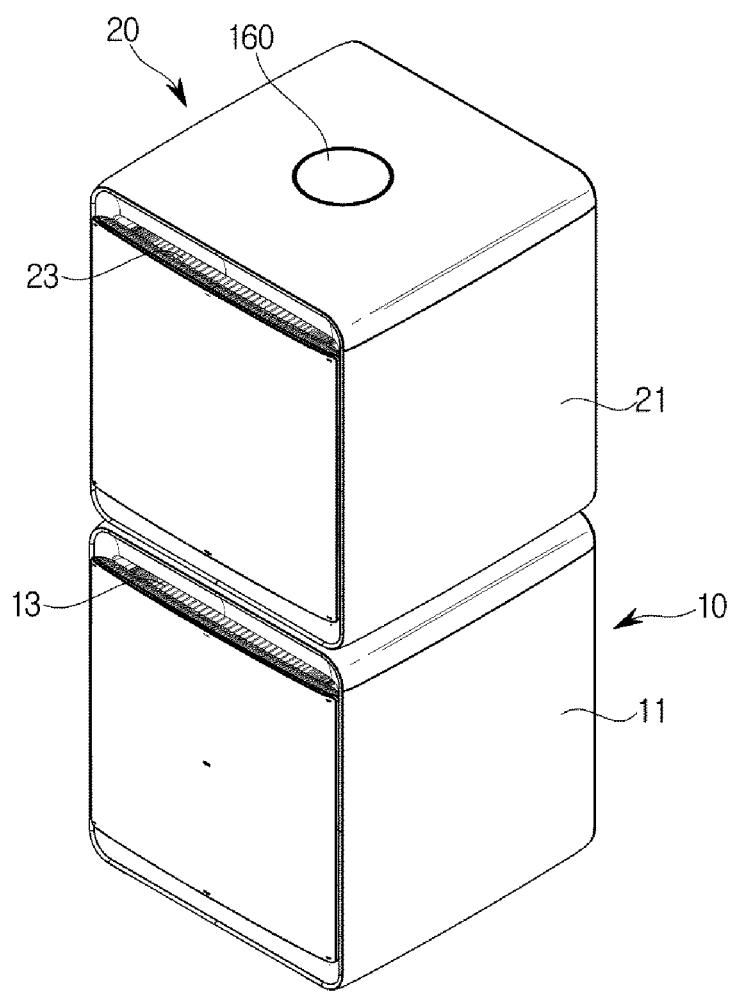
FIG. 2 is a view showing a state in which a second air cleaner is coupled to the first air cleaner shown in FIG. 1.

FIG. 1 is a view showing a first air cleaner according to one embodiment of the present disclosure. FIG. 2 is a view showing a state in which a second air cleaner is coupled to the first air cleaner shown in FIG. 1.

Referring to FIG. 1 and FIG. 2, a first air cleaner 10 according to one embodiment of the present disclosure may be used in combination with a second air cleaner 20. The first air cleaner 10 may be referred to as a first module 10 such as a humidifier or dehumidifier and the second air cleaner 20 may also be referred to as a second module 20 such as a humidifier or dehumidifier.

Hereinafter, the two air cleaners 10 and 20 will be described as an example, but three or more air cleaners may be provided separately or combined. Since the first air cleaner 10 and the second air cleaner 20 have the same configuration, for convenience of explanation, the description of the first air cleaner 10 or the second air cleaner 20 is equally applicable to other air cleaners.

The first air cleaner 10 may include an inlet port (not shown) formed on one surface of a main body 11 to allow air to be drawn in, and an outlet port 13 formed on one surface of the main body 11 so as to discharge air sucked through the inlet port. The inlet port and the outlet port 13 may be formed on different surfaces or may be formed on the same surface. The inlet port may be formed on the rear surface of the main body 11. The outlet port 13 may be formed on the front surface of the main body 11.

A filter unit (not shown) and a fan unit (not shown) may be disposed inside the main body 11. The fan unit may filter the outside air that has been introduced into the main body 11 through the inlet port, through the filter unit, and discharge the filtered air to the outside of the main body 11 through the outlet port 13.

The first air cleaner 10 may be used alone as shown in FIG. 1 and may be used in combination with the second air cleaner 20 as shown in FIG. 2.

When an air cleaner is used in a residential space having a relatively narrow plurality of indoor spaces, the user may separate the first air cleaner 10 and the second air cleaner 20 and drive them in different indoor spaces, therefore, the first air cleaner 10 and the second air cleaner 20 may purify air in different indoor spaces.

On the other hand, when an air cleaner is used in a residential space having a relatively large indoor space, that is, when it is difficult to efficiently purify the indoor air by only one of the air cleaners 10, the user may operate the first air cleaner 10 to clean the air in the indoor space by combining the second air cleaner 20 as shown in FIG. 2.

The second air cleaner 20 may be coupled to the top of the first air cleaner 10. When the second air cleaner 20 is coupled to one side of the first air cleaner 10 in the left-right direction or the front-rear direction, the floor area occupied by the first air cleaner 10 and the second air cleaner 20 increases, therefore, the second air cleaner 20 may be disposed on top of the first air cleaner 10 to minimize the floor area occupied by the air cleaners 10 and 20. The air cleaners 10 and 20 may include a first connecting unit 110 disposed at an upper portion and a second connecting unit 120 disposed at a lower portion. As the air cleaners 10 and 20 are coupled in the vertical direction, the floor area occupied by the air cleaners 10 and 20 remains the same as before, while the filter capacity may be increased. Accordingly, the air cleaners 10 and 20 according to one embodiment of the present disclosure may increase space utilization.

The second air cleaner 20 may include an inlet port 22 formed on one side of the main body 21, and an outlet port 23 formed on one side of the main body 21 to discharge air sucked through the inlet port 22.

Figure 3:
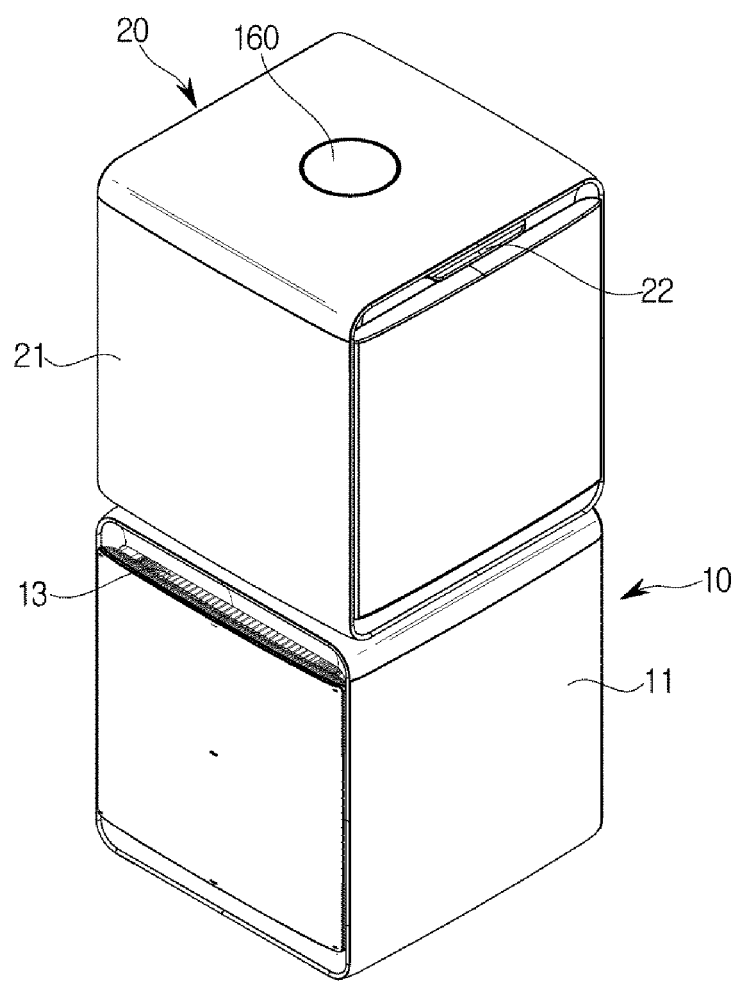
FIG. 3 is a view showing a state in which the second air cleaner is rotated with respect to the first air cleaner shown in FIG. 2.
Figure 4:
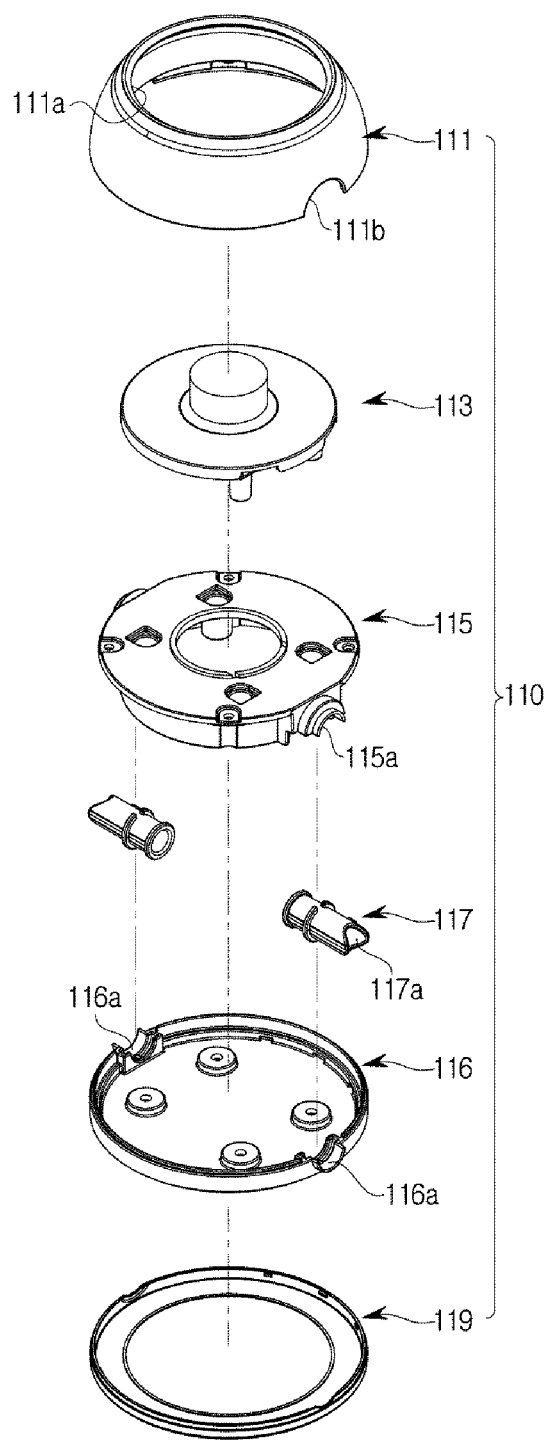
FIG. 4 is an exploded view of a first connecting unit shown in FIG. 1.
Figure 5:
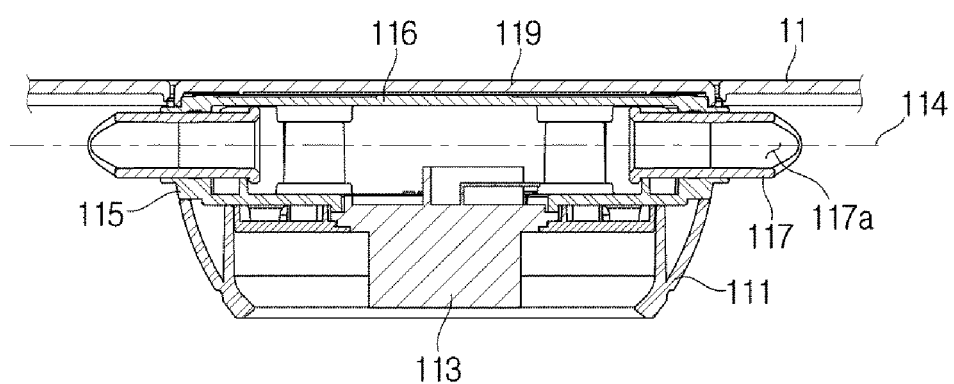
FIG. 5 is a sectional view showing the state of the first connecting unit when the first air cleaner shown in FIG. 1 is used alone.
Figure 6:
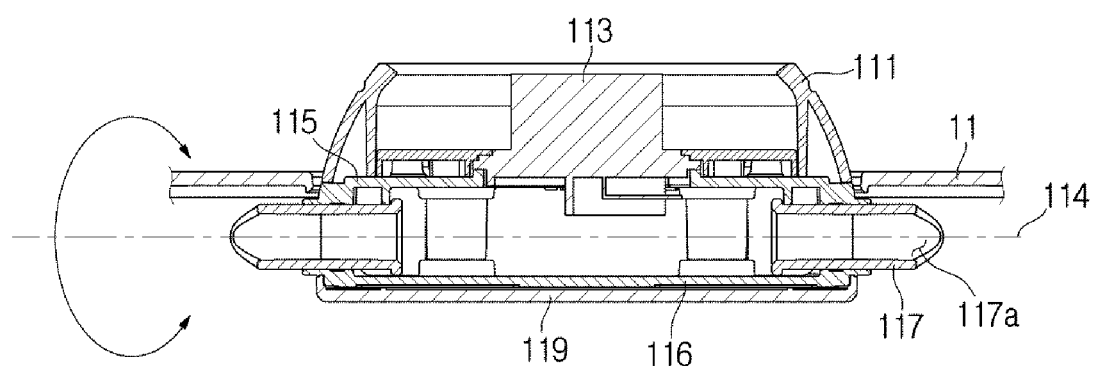
FIG. 6 is a cross-sectional view showing the state of the first connecting unit when the first air cleaner is used in combination with the second air cleaner, as shown in FIG. 2.
Figure 7:
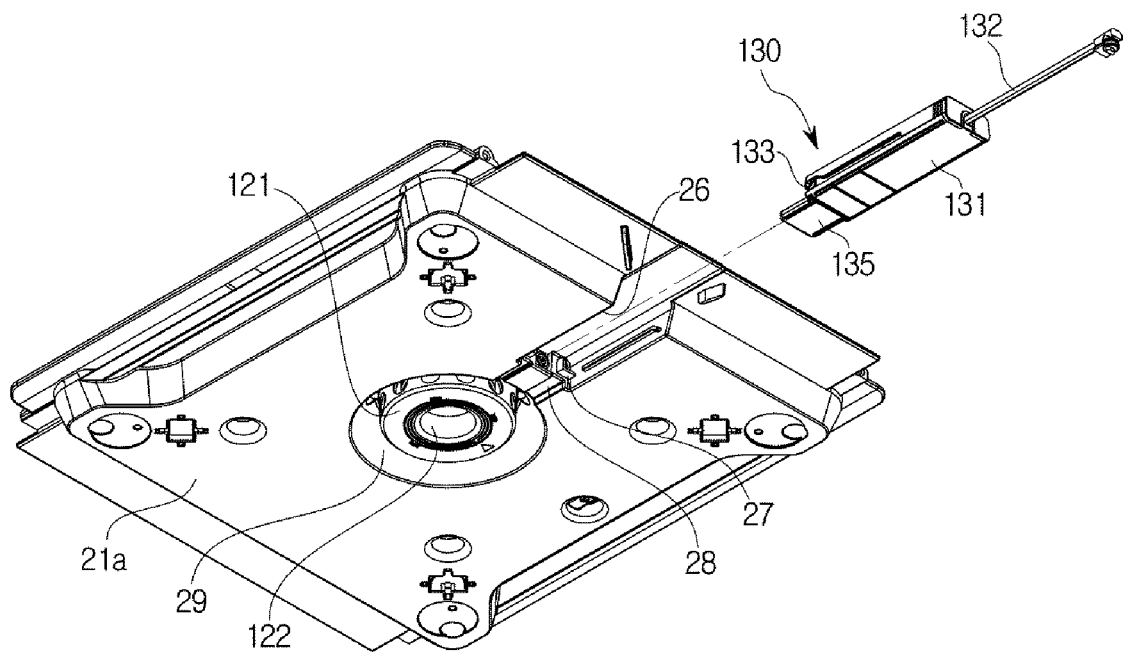
FIG. 7 is a bottom view of a bottom plate of the second air cleaner to which a power adapter is connected when the second air cleaner shown in FIG. 2 is used alone.
Figure 8:
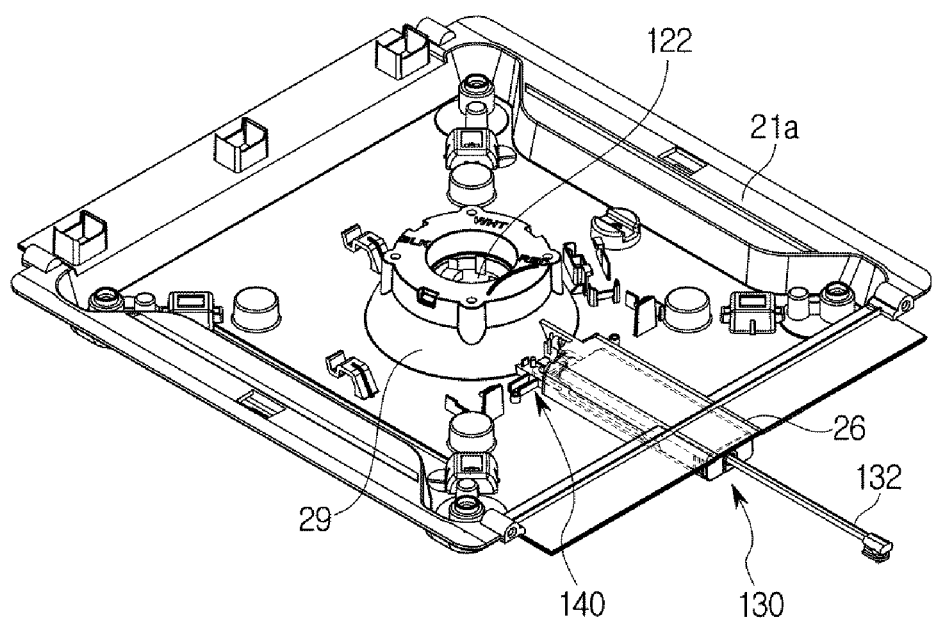
FIG. 8 is a top view of the bottom plate and the power adapter shown in FIG. 7.
Figure 9:
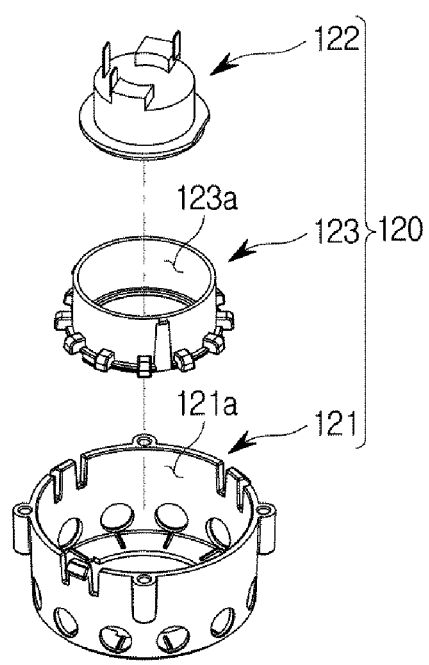
FIG. 9 is an exploded view of a second connecting unit shown in FIG. 8.
Figure 10:
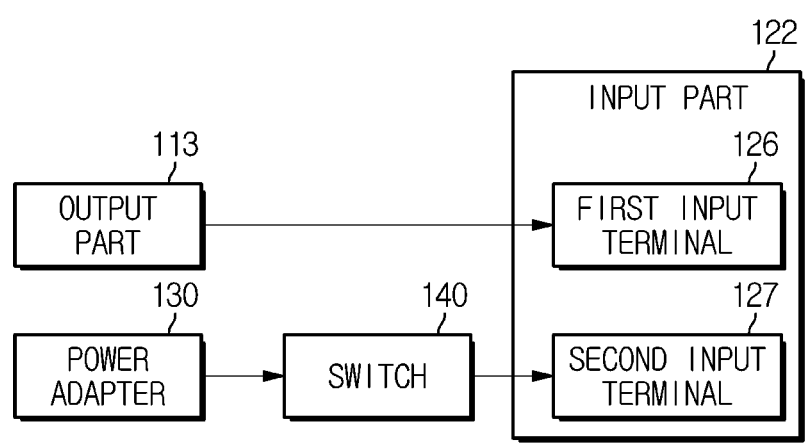
FIG. 10 is a block diagram showing a connection relationship of configurations for supplying power to an input part of the second air cleaner shown in FIG. 2.

FIG. 3 is a view showing a state in which the second air cleaner is rotated with respect to the first air cleaner shown in FIG. 2. FIG. 4 is an exploded view of a first connecting unit shown in FIG. 1. FIG. 5 is a sectional view showing the state of the first connecting unit when the first air cleaner shown in FIG. 1 is used alone. FIG. 6 is a cross-sectional view showing the state of the first connecting unit when the first air cleaner is used in combination with the second air cleaner, as shown in FIG. 2. FIG. 7 is a bottom view of a bottom plate of the second air cleaner to which a power adapter is connected when the second air cleaner shown in FIG. 2 is used alone. FIG. 8 is a top view of the bottom plate and the power adapter shown in FIG. 7. FIG. 9 is an exploded view of a second connecting unit shown in FIG. 8. FIG. 10 is a block diagram showing a connection relationship of configurations for supplying power to an input part of the second air cleaner shown in FIG. 2.

Referring to FIGS. 3 to 6, the first air cleaner 10 may include the first connecting unit 110. The second air cleaner 20 may have a first connecting unit 160 having the same configuration as the first connecting unit 110. Since the first connecting unit 160 of the second air cleaner 20 has the same configuration as the first connecting unit 110 of the first air cleaner 10, the description is omitted.

The first connecting unit 110 may be disposed on top of the first air cleaner 10. The first connecting unit 110 may be detachably coupled to the second connecting unit 120, which will be described later. The first connecting unit 110 may be coupled to the second connecting unit 120 of the second air cleaner 20 to provide power to the second air cleaner 20 through the second connecting unit 120 when the second air cleaner 20 is coupled to the first air cleaner 10.

The second connecting unit 120 may be provided so as to be rotatable with respect to the first connecting unit 110 about a rotational axis corresponding to the direction in which the second connecting unit 120 is coupled. As shown in FIG. 3, the second air cleaner 20 may be arranged to discharge purified air in a direction different from the direction of air being discharged from the first air cleaner 10. The first connecting unit 110 may be provided to be electrically connected to the second connecting unit 120 even if the second air cleaner 20 rotates with respect to the first air cleaner 10. Alternatively, as shown in FIG. 2, the second air cleaner 20 may be arranged to discharge air in the same direction as the direction of air being discharged from the first air cleaner 10.

The first connecting unit 110 may be rotatably coupled to the main body 11 about a rotation axis 114. When the second air cleaner 20 is coupled to the first air cleaner 10, the user may press a portion of the first connecting unit 110 to rotate the first connecting unit 110 relative to the main body 11. The first connecting unit 110 may be in a state in which a cover 119 is disposed inside the main body 11 and an output part 113 is exposed to the outside of the main body 11.

The first connecting unit 110 may include a connection case 111 having open top and bottom surfaces, the cover 119 covering the lower surface of the connection case 111, a shaft 117 that rotatably supports the first connecting unit 110 with respect to the main body 11, a first shaft receiving portion 115 and a second shaft receiving portion 116 for rotatably supporting the shaft 117, and the output part 113.

The connection case 111 may be formed in a shape corresponding to the case inserting opening 19 of the second connecting unit 120. The connection case 111 may be formed in a substantially hemispherical shape and cover the output part 113 disposed inside of the connection case 111.

The connection case 111 may include a power source opening 111*a* so that the output part 113 can be connected to an input part 122.

The connection case 111 may include a receiving portion support groove 111b for supporting the first shaft receiving portion 115.

The output part 113 is coupled to the input part 122 and may be electrically connected. When the output part 113 of the first air cleaner 10 and the input part 122 of the second air cleaner 20 are coupled, the first air cleaner 10 and the second air cleaner 20 may be electrically connected. When the first air cleaner 10 and the second air cleaner 20 are electrically connected, the first air cleaner 10 may be controlled by operating the second air cleaner 20 disposed on top of the first air cleaner 10.

The shaft 117 may support the first connecting unit 110 so that the first connecting unit 110 rotates with respect to the main body 11. The shaft 117 may be rotatably coupled to the first shaft receiving portion 115 and the second shaft receiving portion 116.

The shaft 117 may include a wire passage hole 117a through which a wire electrically connected to the output part 113 may pass. The wire passing through the wire passage hole 117a may supply a portion of the power supplied to the first air cleaner 10 via a power adapter 130 to the output part 113. The power supplied to the output part 113 may be supplied to the second air cleaner 20 via the input part 122.

The first shaft receiving portion 115 may rotatably support a portion of the shaft 117. The first shaft receiving portion 115 may include a first shaft groove 115a in which the shaft 117 is received. The first shaft receiving portion 115 may support the output part 113.

The second shaft receiving portion 116 may rotatably support another portion of the shaft 117. The second shaft receiving portion 116 may include a second shaft groove 116a in which the shaft 117 is received. The second shaft receiving portion 116 may support the cover 119.

The cover 119 forms a portion of the upper surface of the main body 11 so that the first air cleaner 10 has a clean appearance when the output part 113 is disposed inside the main body 11.

Specifically, the cover 119 may be disposed to be exposed to the outside of the main body 11 when the first air cleaner 10 is used alone. The cover 119 may be positioned on substantially the same plane as the upper surface of the main body 11. Accordingly, the first air cleaner 10 may maintain a uniform and clean design as a whole. However, the cover 119 may be disposed inside the main body 11 when the first air cleaner 10 is used in combination with the second air cleaner 20. Accordingly, the first air cleaner 10 may supply power to the second air cleaner 20 through the first connecting unit 110.

The configuration of the first connecting unit 160 of the second air cleaner 20 may be the same as that of the first connecting unit 110 of the first air cleaner 10.

Referring to FIGS. 7 to 9, the second connecting unit 120 may be disposed in a lower housing 21a of the main body 21 of the second air cleaner 20. The first air cleaner 10 may be provided with a second connecting unit (not shown) having the same configuration as the second connecting unit 120.

The second connecting unit 120 may include a lower case 121, a support case 123 disposed inside the lower case 121, and the input part 122 disposed inside the support case 123.

The lower case 121 may have a substantially cylindrical shape. The lower case 121 may support the support case 123. The lower case 121 may cover the support case 123 and the input part 122 disposed in an inner space 121a of the lower case 121. The support case 123 is supported by the lower case 121 and the input part 122 may be disposed in an inner space 123a of the support case 123.

Referring to FIG. 10, the input part 122 may include a first input terminal 126 and a second input terminal 127. The input part 122 may be powered from the output part 113 via the first input terminal 126 or may be powered from the power adapter 130 via the second input terminal 127. Accordingly, the input part 122 may be electrically connected to the output part 113. The input part 122 may be powered from the output part 113. The input part 122 may be electrically connected to the power adapter 130. The input part 122 may be powered by the power adapter 130.

The input part 122 may be disposed inside the support case 123. The input part 122 may be configured to maintain an electrical connection with the output part 113 even if the input part 122 is rotated while being connected to the output part 113.

The second air cleaner 20 may be powered by the power adapter 130 as the power adapter 130 is connected to a switch 140.

Referring to FIG. 7 and FIG. 8, the power adapter 130 may include an adapter case 131, a power supply 132, a limiting protrusion 133, and a guide protrusion 135.

The adapter case 131 may cover the power supply 132 disposed therein. The adapter case 131 may be provided in a size and shape corresponding to the adapter insertion portion 26 formed in the lower housing 21a of the main body 21.

The power supply 132 may be provided to guide the power supplied from the outside to the second air cleaner 20. The power supply 132 may be coupled to the switch 140.

Figure 13:
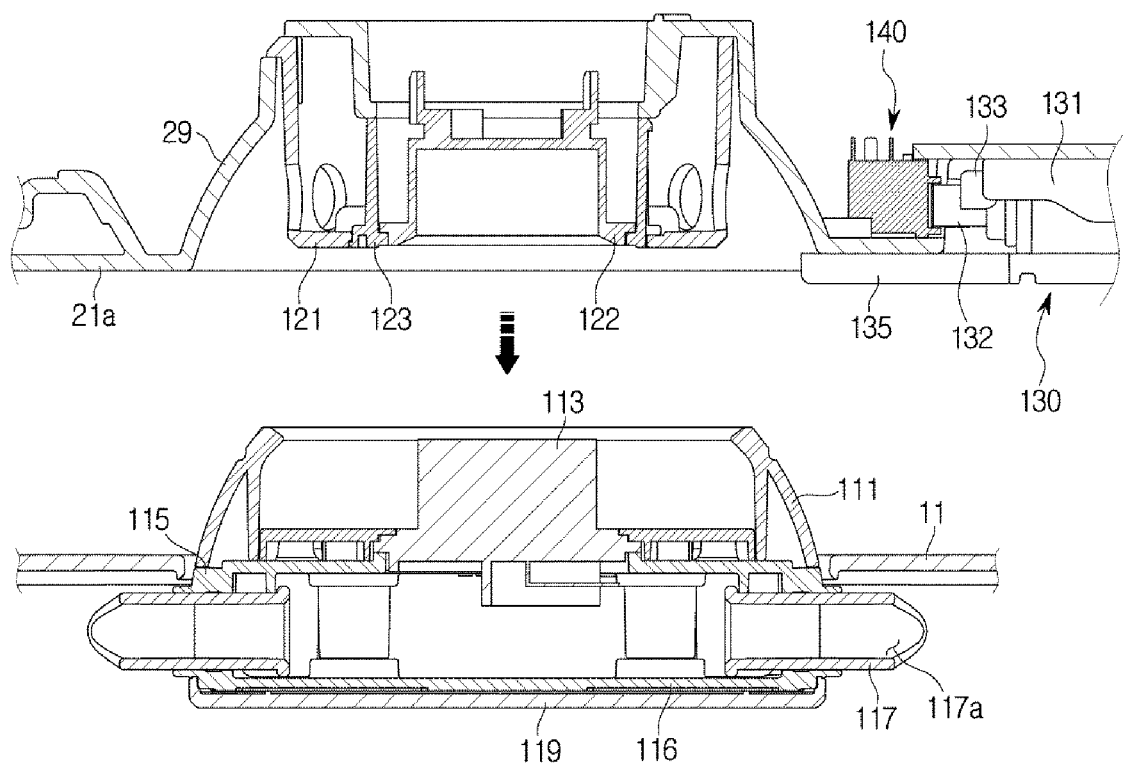
FIG. 13 and FIG. 14 sequentially illustrate the process of separating the power adapter from the second connecting unit as the first connecting unit is coupled to the second connecting unit when the power adapter is connected to the second connecting unit.
Figure 14:
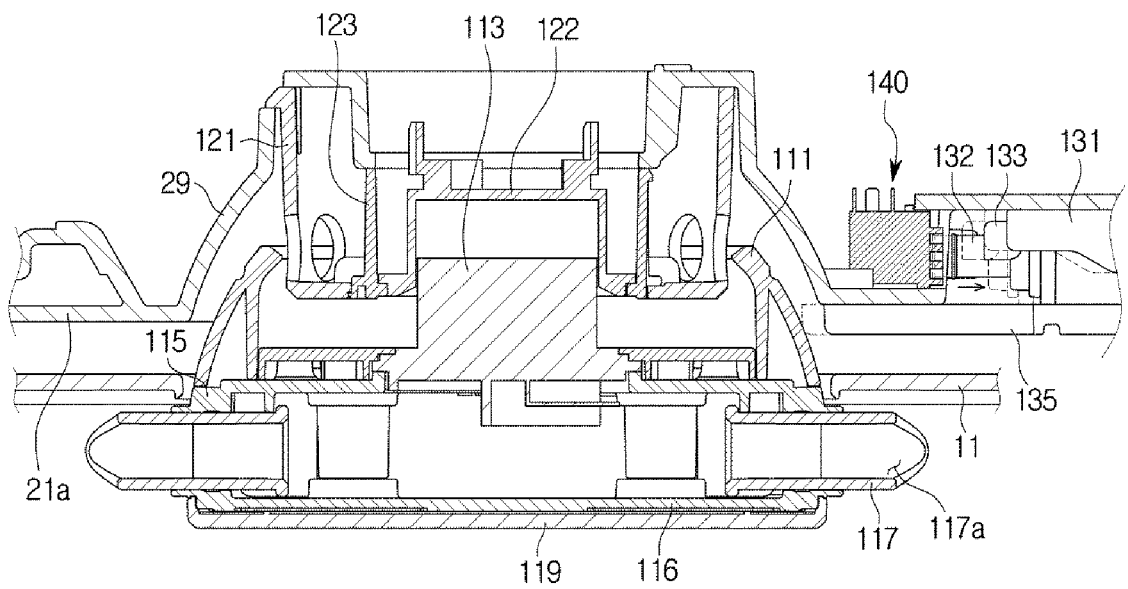

The limiting protrusion 133 may be formed at one end of the adapter case 131 that is connected to the second air cleaner 20. Referring to FIG. 13 and FIG. 14, the limiting protrusion 133 may be formed to be inserted into the restriction portion 27 formed in the lower housing 21a of the main body 21. When attempting to connect a power adapter that is not suitable for the second air cleaner 20, the connection is blocked by the restriction portion 27. The limiting protrusion 133 is provided in a size and/or shape corresponding to the restriction portion 27, therefore, the power adapter 130 may not be connected to the first air cleaner 10 or the second air cleaner 20 when the power adapter 130 with the limiting protrusion 133 is not suitable.

The guide protrusion 135 may be guided by the guide groove 28 formed in the lower housing 21a of the main body 21. The power adapter 130 may be connected to the second air cleaner 20 in the correct position by the guide protrusion 135.

The switch 140 may be configured to electrically connect the power adapter 130 to the input part 122 when the switch 140 is connected to the power adapter 130. The switch 140 may be configured to shut off the electrical connection between the power adapter 130 and the input part 122 when the switch 140 is disconnected from the power adapter 130.

Figure 11:
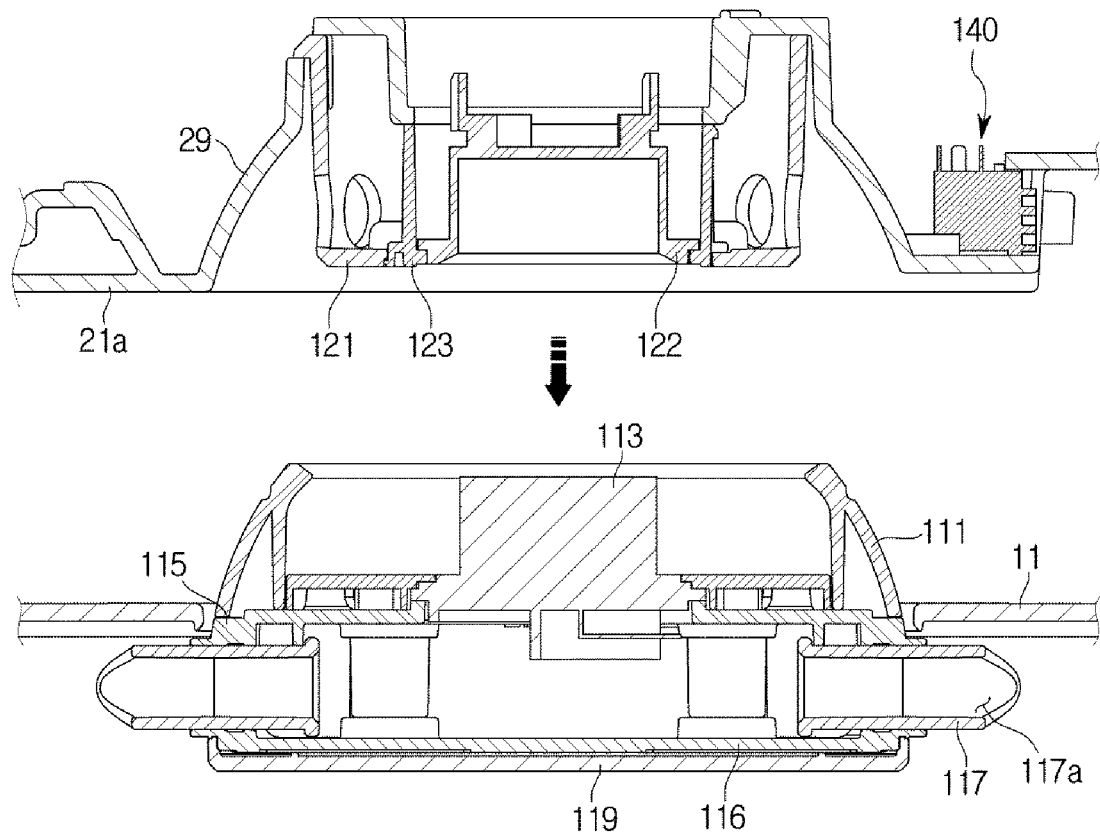
FIG. 11 and FIG. 12 sequentially illustrate the process of combining the first connecting unit and the second connecting unit.
Figure 12:
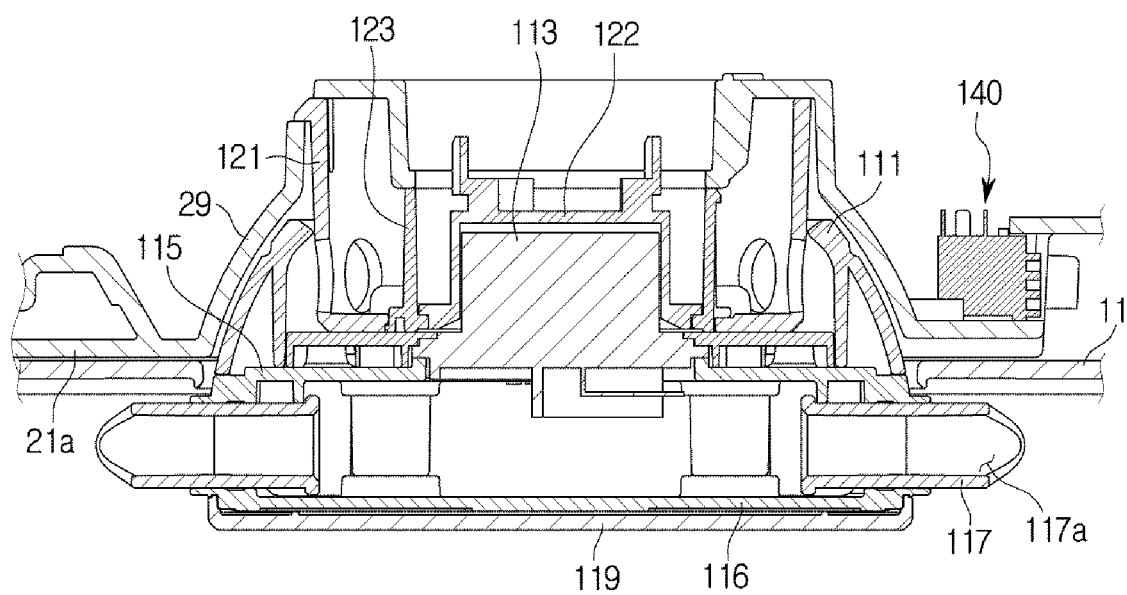

FIG. 11 and FIG. 12 sequentially illustrate the process of combining the first connecting unit and the second connecting unit. FIG. 13 and FIG. 14 sequentially illustrate the process of separating the power adapter from the second connecting unit as the first connecting unit is coupled to the second connecting unit when the power adapter is connected to the second connecting unit.

Referring to FIG. 11 and FIG. 12, a process of connecting the second connecting unit 120 of the second air cleaner 20 to the first connecting unit 110 of the first air cleaner 10 will be described when the second air cleaner 20 is coupled to the first air cleaner 10.

The output part 113 of the first connecting unit 110 may be exposed to the outside so that the first air cleaner 10 supplies power to the second air cleaner 20. That is, the user can rotate the first connecting unit 110 around the rotation axis 114 by pressing the cover 119 disposed outside the first connecting unit 110. Accordingly, the first connecting unit 110 and the second connecting unit 120 are in the state shown in FIG. 10.

The user may couple the second air cleaner 20 to the top of the first air cleaner 10. The second air cleaner 20 may be coupled in the downward direction at the top of the first air cleaner 10. Accordingly, the output part 113 may be electrically connected to the input part 122. The first air cleaner 10 can receive power from the power adapter 130 through the second connecting unit 120 of the first air cleaner 10. A portion of the supplied power is sequentially passed through the first connecting unit 110 of the first air cleaner 10 and the second connecting unit 120 of the second air cleaner 20 and is supplied to the second air cleaner 20.

However, the user may attempt to combine the first air cleaner 10 with the second air cleaner 20 without detaching the power adapter 130 when the second air cleaner 20 is used alone by connecting the power adapter 130. In this case, there is a need to prevent double powering of the second air cleaner 20 through the power adapter 130 and the output part 113 of the first air cleaner 10.

Referring to FIG. 13 and FIG. 14, the second air cleaner 20 according to one embodiment of the present disclosure may not be powered even if it is coupled to the first air cleaner 10 while the power adapter 130 is connected.

Specifically, when the second air cleaner 20, to which the power adapter 130 is connected, is coupled to the first air cleaner 10, the first connecting unit 110 of the first air cleaner 10 may press the guide protrusion 135 of the power adapter 130 such that the power adapter 130 is separated from the second air cleaner 20. When the connection case 111 of the first connecting unit 110 is inserted into the case inserting opening 19, the connection case 111 may press the guide protrusion 135 of the power adapter 130 to the right so that the power adapter 130 is disconnected from the switch 140. Accordingly, the electrical connection between the input part 122 of the second air cleaner 20 and the power adapter 130 is released and the second air cleaner 20 may be powered via the output part 113 that is connected to the input part 122.

More specifically, referring to FIG. 10, the second air cleaner 20 may be powered via the first input terminal 126 when the output part 113 is connected to the input part 122. On the other hand, when the power adapter 130 is connected to the switch 140, the second air cleaner 20 may be powered via the second input terminal 127 as the power adapter 130 and the input part 122 are electrically connected by the switch 140.

According to such a configuration, the air cleaners 10 and 20 according to the embodiment of the present disclosure may prevent the power supply from being doubly applied, so that the safety of use is increased.

In FIGS. 1 to 14, the air cleaners 10 and 20 are described as being configured such that the switch 140 connects the first input terminal 126 and the output part 113, or the switch 140 connects the second input terminal 127 and the power adapter 130 as the power adapter 130 is connected to or disconnected from the switch 140. However, the present disclosure is not limited to this. When the switch 140 is connected to the power adapter 130, the switch 140 may sense that the output part 113 of the first air cleaner 10 is electrically connected to the first input terminal 126 to block the electrical connection between the power adapter 130 and the second input terminal 127.

Figure 15:
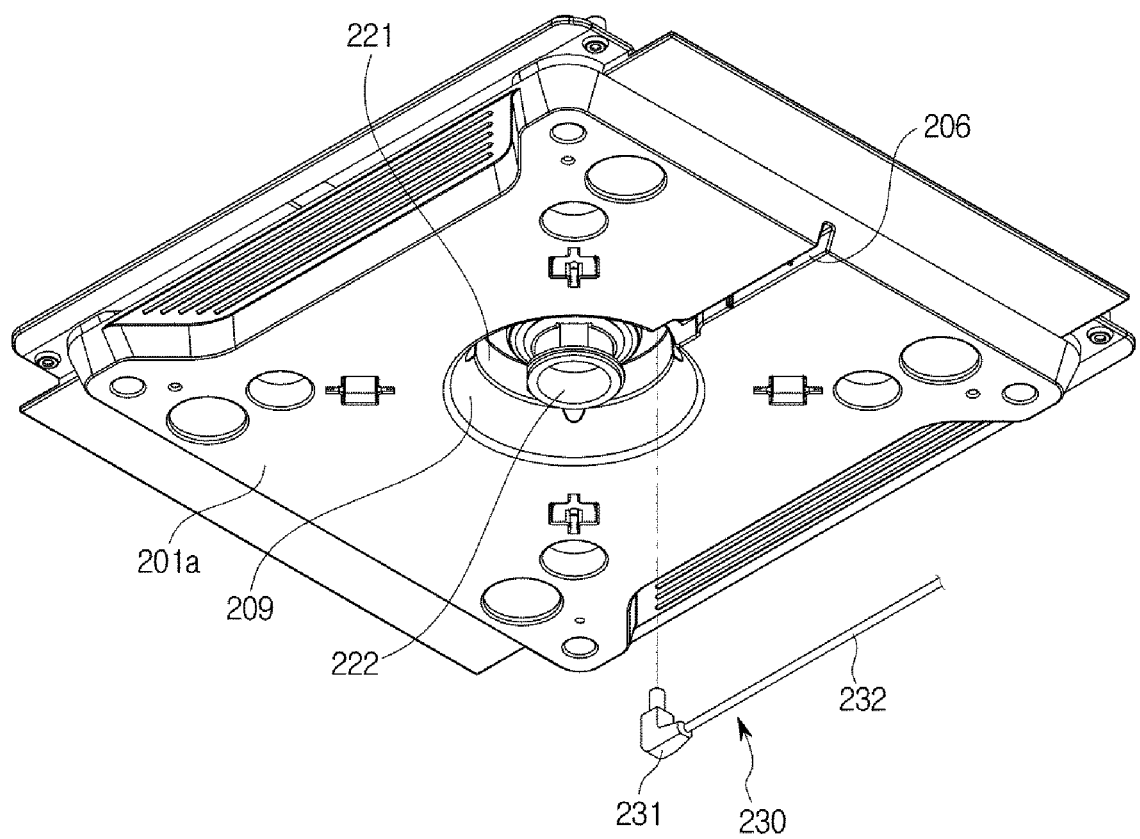
FIG. 15 is a bottom view of a bottom plate of a second air cleaner to which a power adapter is connected when the second air cleaner according to another embodiment is used alone.
Figure 16:
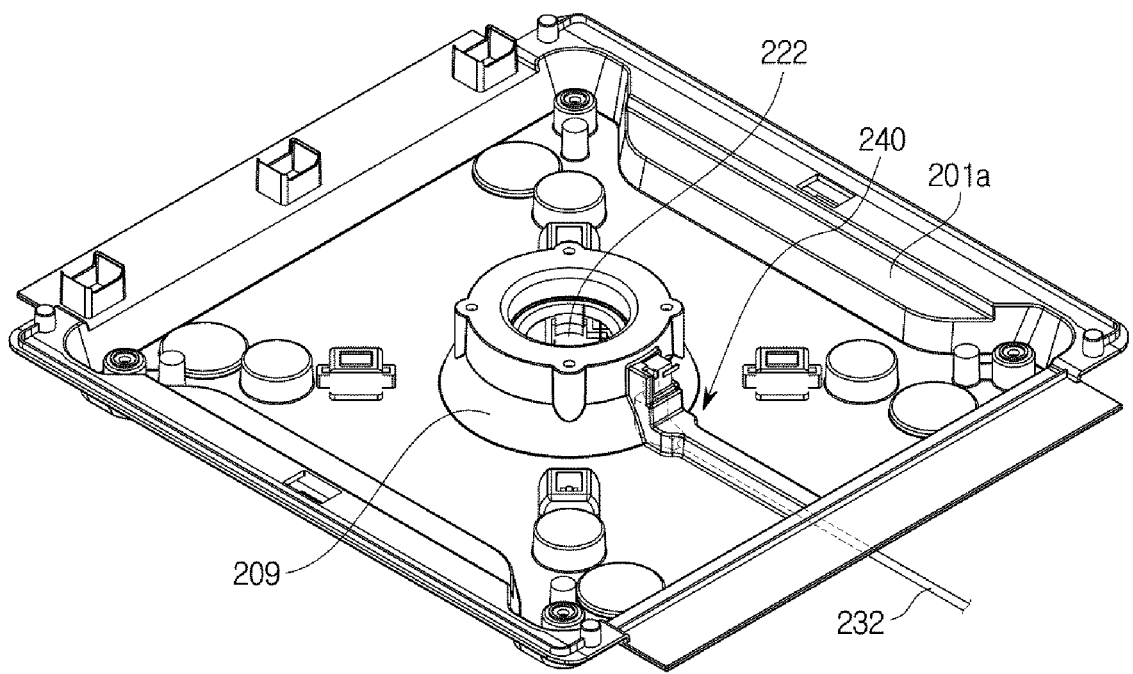
FIG. 16 is a top view of the bottom plate and the power adapter shown in FIG. 15.
Figure 17:
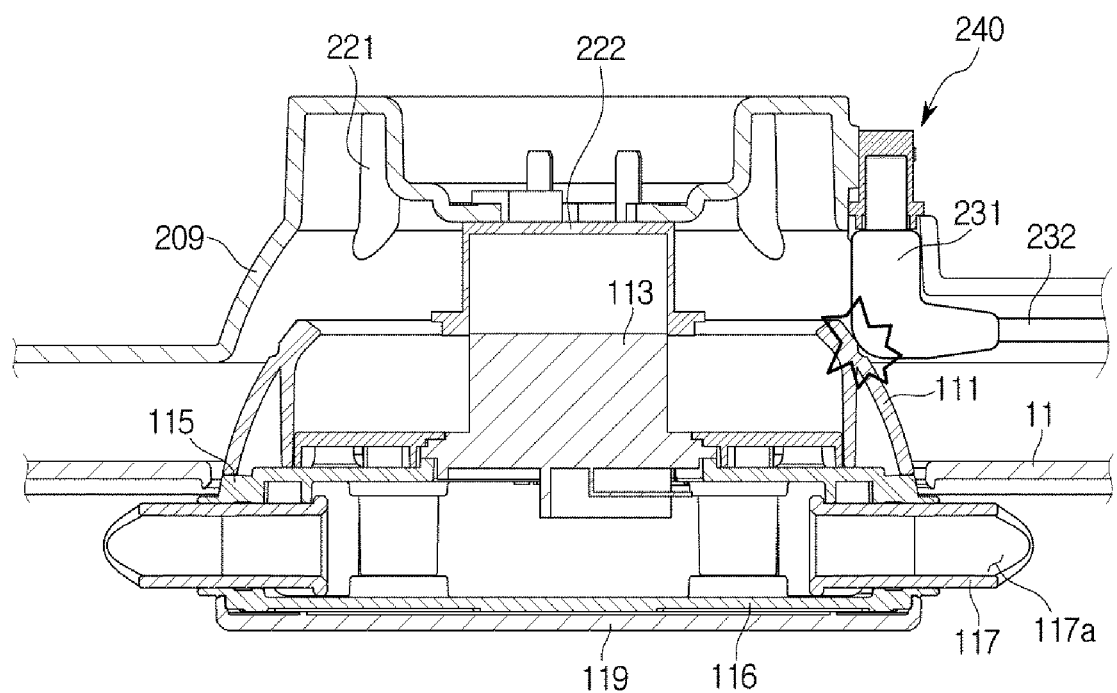
FIG. 17 is a view showing that a first air cleaner and the second air cleaner are prevented from being combined when the first air cleaner is coupled to the second air cleaner in a state where the power adapter is coupled to the second air cleaner as shown in FIG. 16.

FIG. 15 is a bottom view of a bottom plate of a second air cleaner to which a power adapter is connected when the second air cleaner according to another embodiment is used alone. FIG. 16 is a top view of the bottom plate and the power adapter shown in FIG. 15. FIG. 17 is a view showing that a first air cleaner and the second air cleaner are prevented from being combined when the first air cleaner is coupled to the second air cleaner in a state where the power adapter is coupled to the second air cleaner as shown in FIG. 16.

A structure for preventing the application of the double power source according to another embodiment of the present disclosure will be described with reference to FIGS. 15 to 17. In describing the embodiments shown in FIGS. 15 to 17, the same components as those shown in FIGS. 1 to 14 are denoted by the same reference numerals and the description thereof may be omitted.

Referring to FIG. 15 and FIG. 16, a lower housing 201a of the main body 21 may include a case inserting opening 209 into which the first connecting unit 110 is inserted.

The lower housing 201a may include an input part 222 that is configured to be electrically connected to the output part 113 of the first connecting unit 110. The lower housing 201a may include a terminal cover portion 221 provided to cover the input part 222.

The lower housing 201a may include an adapter insertion portion 206 into which a power adapter 230 is inserted. The adapter insertion portion 206 may be formed to correspond to the shape and size of the power adapter 230.

The power adapter 230 may include an adapter case 231 and a power supply 232. The adapter case 231 may guide the power supply 232 such that the power supply 232 may be connected to the switch 240.

The switch 240 may be disposed on the upper surface of the lower housing 201a. When the switch 240 is connected to the power adapter 230, the switch 240 may electrically connect the power adapter 230 and the input part 222. On the other hand, when the power adapter 230 is disconnected from the switch 240, the switch 240 may release the electrical connection between the power adapter 230 and the input part 222.

Referring to FIG. 17, the user may attempt to connect the second air cleaner 20 and the first air cleaner 10 when the power adapter 230 is connected to the second air cleaner 20. The connection case 111 of the first connecting unit 110 of the first air cleaner 10 collides with the adapter case 231 of the power adapter 230 when the connection case 111 is inserted into the case inserting opening 209. Thus, the output part 113 may not be electrically connected to the input part 222.

According to this configuration, the air cleaners 10 and 20 according to another embodiment of the present disclosure may prevent double power supply.

Figure 18:
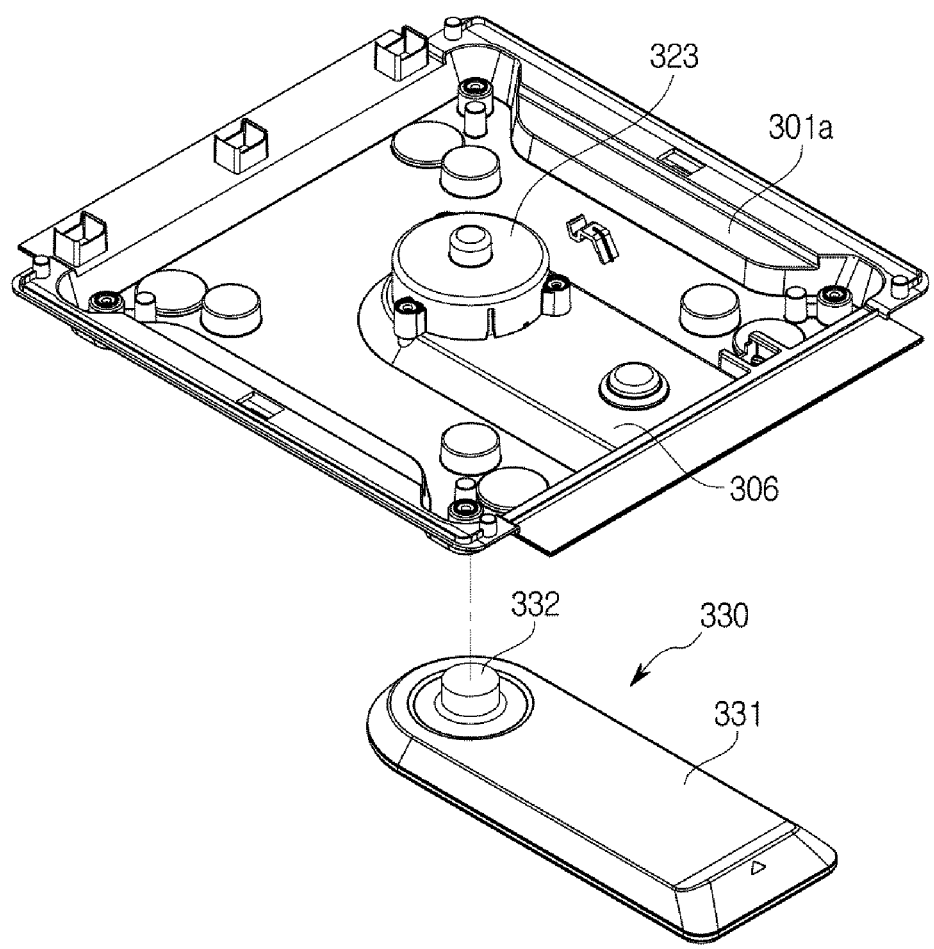
FIG. 18 is a bottom view of a bottom plate of a second air cleaner to which a power adapter is connected when the second air cleaner according to another embodiment is used alone.
Figure 19:
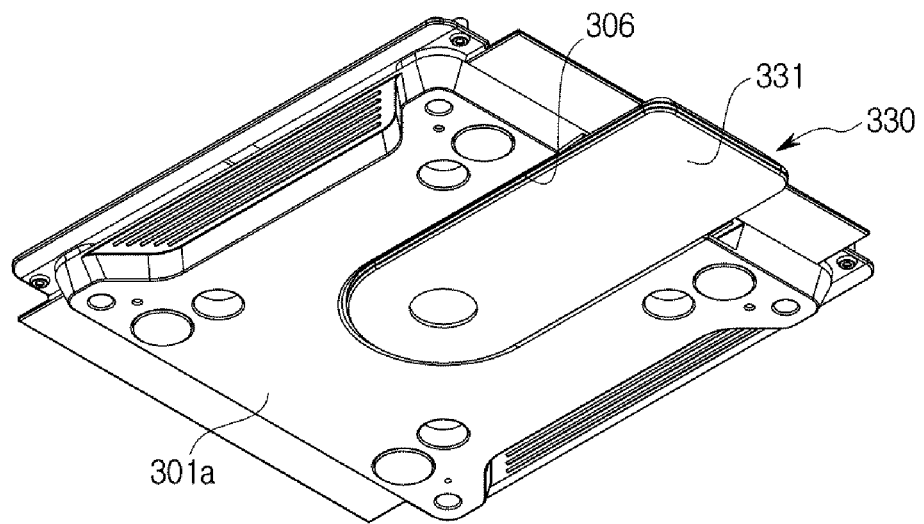
FIG. 19 is a top view of the bottom plate and the power adapter shown in FIG. 18.

FIG. 18 is a bottom view of a bottom plate of a second air cleaner to which a power adapter is connected when the second air cleaner according to another embodiment is used alone. FIG. 19 is a top view of the bottom plate and power adapter shown in FIG. 18.

A structure for preventing the application of the double power source according to another embodiment of the present disclosure will be described with reference to FIG. 18 and FIG. 17. In describing the embodiments shown in FIGS. 18 and 19, the same components as those shown in FIGS. 1 to 14 are denoted by the same reference numerals and the description thereof may be omitted.

Referring to FIG. 18 and FIG. 19, a lower housing 301a may include a terminal cover portion 323 covering the input part 122. The lower housing 301a may include an adapter insertion portion 306 into which a power adapter 330 is inserted. The adapter insertion portion 306 may have a size and/or shape corresponding to the power adapter 330.

The power adapter 330 may include an adapter case 331 and a power supply 332. The power adapter 330 may be coupled to the lower housing 301a from the lower side to the upper side.

As shown in FIG. 19, when the power adapter 330 is coupled to the second air cleaner 20, the bottom surface of the power adapter 330 and the bottom surface of the second air cleaner 20 may be positioned to be approximately in the same plane.

According to this configuration, the second air cleaner 20 connected to the power adapter 330 may not be connected to the first air cleaner 10. The air cleaners according to another embodiment of the present disclosure may prevent the power from being applied to the second air cleaner 20 in a double manner when the second air cleaner 20 is used in combination with the first air cleaner 10.

As is apparent from the above description, the air cleaner or the home appliance includes two input terminals, and thus can be combined with other air cleaners to operate as a single unit or can operate independently of other air cleaners.

The air cleaner or the home appliance has a structure that physically cuts off the electrical connection of the first input terminal when the power adapter is connected to the second input terminal or has a switch, so that the air cleaner can be prevented from having a double power supply.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An air cleaner comprising:
   a first air cleaner having an output part;
   a second air cleaner configured to be electrically connectable to the first air cleaner;
   a power adapter attachable to or detachable from the second air cleaner and to supply power to the second air cleaner;
   a first input terminal provided in the second air cleaner and configured to be electrically connected to the output part;
   a second input terminal provided in the second air cleaner and configured to be electrically connected to the power adapter; and
   a switch configured to electrically connect the first input terminal to the output part or to electrically connect the second input terminal to the power adapter,
   wherein the first air cleaner is configured to separate the power adapter from the second air cleaner when the second air cleaner coupled to the power adapter is coupled to the first air cleaner.

2. The air cleaner according to claim 1, wherein the switch is configured to:
   electrically couple the power adapter and the second input terminal when the power adapter is connected to the switch; and
   electrically couple the output part to the first input terminal when the power adapter is disconnected from the switch.

3. The air cleaner according to claim 1, wherein the second air cleaner is configured to:
   receive power via the first input terminal when the second air cleaner is connected to the first air cleaner; and
   receive power from the second input terminal when the second air cleaner is connected to the power adapter.

4. The air cleaner according to claim 1, wherein the first air cleaner includes a connection case configured to at least partially cover the output part, and
   the connection case is configured to press the power adapter in a direction away from the second air cleaner when the second air cleaner coupled to the power adapter is coupled to the first air cleaner.

5. The air cleaner according to claim 4, wherein the power adapter includes a guide protrusion protruding from the connection case to be pressed.

6. The air cleaner according to claim 5, wherein the second air cleaner includes a case inserting opening formed to correspond to the connection case and into which the connection case is inserted, and
   the guide protrusion extends inside the case inserting opening.

7. The air cleaner according to claim 5, wherein the second air cleaner includes a guide groove recessed in a bottom surface thereof to guide the guide protrusion.

8. The air cleaner according to claim 1, further comprising a shaft disposed in the first cleaner to rotatably support the output part so that the output part is selectively exposed to outside of the first air cleaner or hidden inside of the first air cleaner.

9. The air cleaner according to claim 8, wherein the second air cleaner includes a restriction portion formed at a portion connected to the power adapter, and
   the power adapter includes a limiting protrusion coupled to the restriction portion.

10. The air cleaner according to claim 1, wherein the second air cleaner includes an insertion portion formed on the bottom surface to correspond to the power adapter.

11. The air cleaner according to claim 1, wherein the switch is configured to:
    disconnect the first input terminal and the output part when the power adapter is engaged to the switch; and
    disconnect the second input terminal and the power adapter when the power adapter is disengaged from the switch.

12. The air cleaner according to claim 1, wherein the power adapter is arranged to interfere with the coupling of the first air cleaner and the second air cleaner when the power adapter is connected to the second air cleaner.

13. The air cleaner according to claim 1, wherein the output part is disposed on top of the first air cleaner, and
    at least one of the first input terminal and the second input terminal is disposed below the second air cleaner.

14. The air cleaner according to claim 1, wherein the bottom surface of the power adapter is disposed in a same plane as the bottom surface of the second air cleaner when the power adapter is connected to the second air cleaner.

15. A home appliance comprising:
    a first module having an output part;
    a second module configured to be electrically connectable to the first module;
    a power adapter attachable to or detachable from the second module, and to supply power to the second module;
    a first input terminal provided in the second module and configured to be electrically connected to the output part;

a second input terminal provided in the second module and configured to be electrically connected to the power adapter; and a switch disposed in the second module and configured to block an electrical connection between the power adapter and the second input terminal when the first module and the second module are combined, wherein the first module is configured to separate the power adapter from the second module when the second module coupled to the power adapter is coupled to the first module.

16. The home appliance according to claim 15, wherein the first module includes a connection case configured to cover at least one of the first input terminal and the second input terminal, and the connection case is configured to press the power adapter in a direction away from the second module when the second module coupled to the power adapter is coupled to the first module.

17. The home appliance according to claim 15, wherein the second module includes a restriction portion formed at a portion connected to the power adapter, and the power adapter includes a limiting protrusion coupled to the restriction portion.

18. The home appliance according to claim 15, wherein the power adapter is arranged to interfere with the coupling of the first module and the second module when the power adapter is connected to the second module.

19. The home appliance according to claim 15, further comprising a shaft disposed in the first module to rotatably support the output part so that the output part is selectively exposed to outside of the first module or hidden inside of the first module.

* * * * *